United States Patent
Campbell

[19]

[11] Patent Number: 6,052,900
[45] Date of Patent: Apr. 25, 2000

[54] METHOD OF ASSEMBLING A POWER STEERING CONTROL VALVE

[75] Inventor: Christopher T. Campbell, Morristown, Tenn.

[73] Assignee: TRW Inc., Lyndhurst, Ohio

[21] Appl. No.: 09/102,137

[22] Filed: Jun. 22, 1998

[51] Int. Cl.[7] ..................................................... B23P 17/00
[52] U.S. Cl. .................... 29/890.13; 29/515; 29/890.124
[58] Field of Search ........................ 29/890.13, 890.126, 29/890.124, 515, 516; 91/375 A; 60/327

[56] References Cited

U.S. PATENT DOCUMENTS

| | | | |
|---|---|---|---|
| 4,561,516 | 12/1985 | Bishop et al. | 91/375 A |
| 4,606,424 | 8/1986 | Hasegawa | 91/375 A |
| 4,644,846 | 2/1987 | Kozuka | 91/375 A |
| 4,819,545 | 4/1989 | Dymond . | |
| 4,877,100 | 10/1989 | Emori et al. | 91/375 A |
| 5,136,772 | 8/1992 | Rupprecht et al. | 29/515 |
| 5,230,273 | 7/1993 | Fraley, Jr. . | |
| 5,575,193 | 11/1996 | Bareis et al. | 91/375 A |
| 5,582,207 | 12/1996 | Gilbert et al. | 91/375 A |
| 5,655,621 | 8/1997 | Birsching | 91/375 A |
| 5,682,745 | 11/1997 | Phillips | 91/375 A |
| 5,799,380 | 9/1998 | Pfeifer | 29/890.124 |
| 5,811,684 | 9/1998 | Sokn | 29/516 |
| 5,832,588 | 11/1998 | Ridenour et al. | 29/516 |
| 5,842,538 | 12/1998 | Sangret | 91/375 A |

FOREIGN PATENT DOCUMENTS

| | | | |
|---|---|---|---|
| 2044697 | 10/1980 | United Kingdom | 91/375 A |
| 2212463 | 7/1989 | United Kingdom | 91/375 A |

*Primary Examiner*—Irene Cuda
*Assistant Examiner*—Trinh T. Nguyen
*Attorney, Agent, or Firm*—Tarolli, Sundheim, Covell, Tummino & Szabo L.L.P.

[57] ABSTRACT

A power steering control valve (22) has an inner valve member (40) which is connected with a follow-up member (54) by a torsion bar (102). An outer valve member (42) is fixedly connected with the follow-up member (54) by indentations (56). Before the outer valve member (42) is fixedly connected with the follow-up member (54) by the indentations (56), the inner and outer valve members (40 and 42) are moved relative to each other to determine a hydraulically centered condition. When the power steering control valve (22) is in the hydraulically centered condition, equal fluid pressures are conducted to a power steering motor (31) in response to equal clockwise or counterclockwise actuation of the valve members (40 and 42) relative to each other. The outer valve member (42) is then fixedly connected with the follow-up member (54) with the power steering control valve (22) in the hydraulically centered condition.

5 Claims, 3 Drawing Sheets

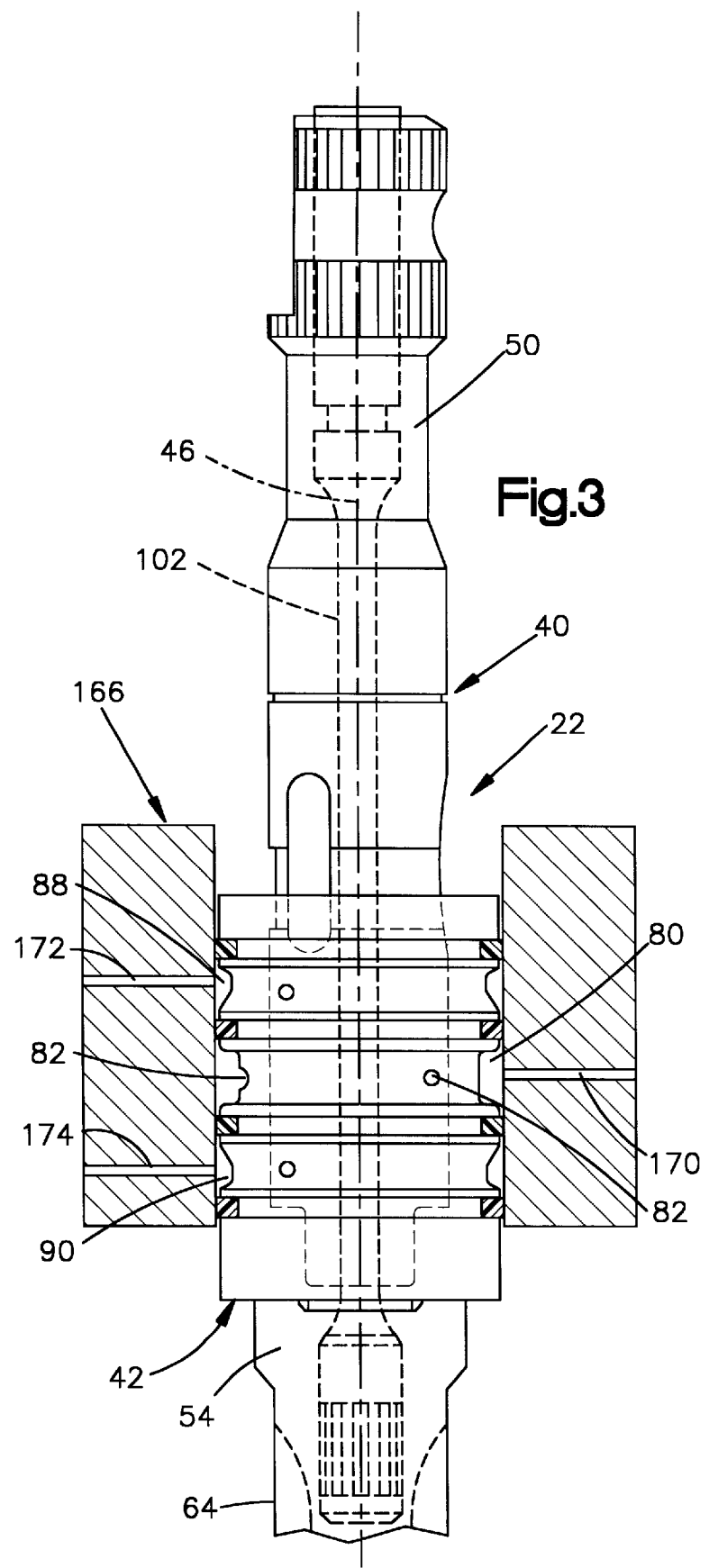

METHOD OF ASSEMBLING A POWER STEERING CONTROL VALVE

BACKGROUND OF THE INVENTION

The present invention relates to a new and improved method of assembling a power steering control valve and, more specifically to a method of assembling a power steering control valve which is hydraulically centered.

A power steering control valve is hydraulically centered when equal fluid pressures are conducted to a power steering motor in response to equal clockwise and counterclockwise actuation of the power steering control valve.

A method of hydraulically centering a power steering control valve is disclosed in U.S. Pat. No. 5,230,273. In this patent, an outer valve member and follow-up member are connected with one end of a torsion bar. An inner valve member is positioned within the outer valve member. When a hydraulically centered condition has been determined for the power steering control valve, a hole is drilled in the inner valve member and an end portion of the torsion bar. A pin is inserted into this hole to interconnect the inner valve member and the torsion bar.

It has also been suggested that a hydraulically centered condition may be obtained for a power steering control valve by first interconnecting the follow-up member, torsion bar and inner valve member. An outer valve member is then moved relative to the inner valve member. When a hydraulically centered condition has been ascertained for the outer valve member, the follow-up member is pressed into the outer valve member. This method of assembling a power steering control valve is disclosed in U.S. patent application Ser. No. 08/496,766 filed Jun. 29, 1995 and entitled "Method and Device for Assembling a Servo Valve."

SUMMARY OF THE INVENTION

The present invention provides a new and improved method of assembling a power steering control valve. The power steering control valve has an inner valve member which is connected with a follow-up member by a torsion bar. An outer valve member at least partially encloses the inner valve member. In accordance with a feature of the present invention, the outer valve member is connected with the follow-up member by an indentation formed by plastically deforming the outer valve member.

During assembly, the inner and outer valve members are moved relative to each other to determine when they are in a hydraulically centered condition relative to each other. The outer valve member and the follow-up member are then fixedly interconnected by plastically deforming the outer valve member to grip the follow-up member.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a schematic illustration depicting the manner in which inner and outer valve members of the power steering control valve of FIG. 1 are placed in a fixture to determine a hydraulically centered condition between the inner and outer valve members.

DESCRIPTION OF ONE SPECIFIC PREFERRED EMBODIMENT OF THE INVENTION

Figure 1:
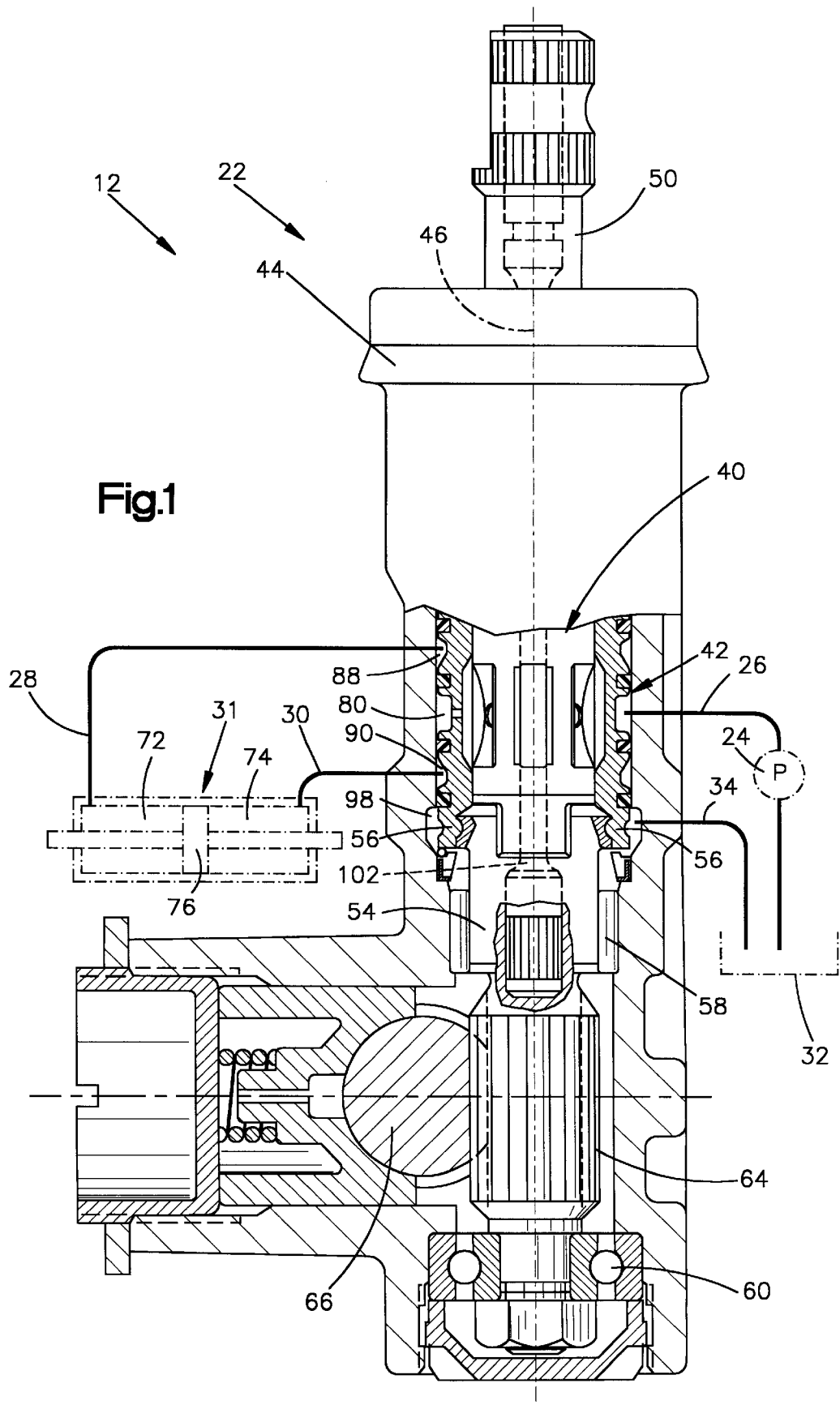
FIG. 1 is a partially broken away schematic illustration of a power steering apparatus having a power steering control valve assembled by the method of the present invention.

A vehicle power steering system 12 (FIG. 1) is operable to turn steerable vehicle wheels (not shown) upon rotation of a steering wheel (not shown) by an operator of a vehicle. Rotation of the steering wheel actuates a power steering control valve 22 to port fluid from an engine driven pump 24 and supply conduit 26 to either one of a pair of motor conduits 28 and 30. The high pressure fluid conducted from the supply conduit 26 through one of the motor conduits 28 or 30 effects operation of a power steering motor 31 to turn the steerable vehicle wheels in a known manner. Fluid is conducted from the motor 31 to a reservoir 32 through the other one of the motor conduits 28 or 30, the power steering control valve 22, and return conduit 34.

The power steering control valve 22 includes a first or inner valve member 40 and a second or outer valve member 42. The outer valve member 42 is cylindrical and encloses the inner valve member 40. The inner valve member 40 and the outer valve member 42 are rotatable relative to each other and to a housing 44 about a common central axis 46.

The inner valve member 40 is formed as one piece with a cylindrical input member or valve stem 50 (FIG. 1) which is connected with the steering wheel. The one piece outer valve member 42 is fixedly connected with a follow-up member 54 by indentations 56. The follow-up member 54 is rotatably supported in the housing 44 by bearings 58 and 60. A pinion gear 64 is formed on the follow-up member 54. The pinion gear 64 is disposed in meshing engagement with a rack 66. The rack 66 is connected with the power steering motor 31 and steerable vehicle wheels.

The power steering control valve 22 is of the known open-center type. Therefore, when the power steering control valve is in an unactuated position, fluid pressure from the pump 24 is conducted through the motor conduits 28 and 30 to motor cylinder chambers 72 and 74 on opposite sides of a piston 76 in the power steering motor 31. Fluid flow is conducted from the power steering control valve 22 to the reservoir 32 through the return conduit 34.

The power steering control valve 22 is hydraulically centered. Therefore, equal fluid pressures are present in the motor cylinder chambers 72 and 74 when the power steering control valve 22 is in an unactuated position.

Upon rotation of the steering wheel (not shown) and rotation of the valve stem 50, the inner valve member 40 is rotated about the axis 46 relative to the housing 44 and outer valve member 42. This directs high pressure fluid from the pump 24 to one of the motor conduits 28 or 30 and directs fluid from the other motor conduit to the reservoir 32. Since the power steering control valve 22 is hydraulically centered, equal amounts of rotation of the steering wheel in opposite directions from the initial position results in the same relatively high fluid pressure being conducted through the motor conduits 28 and 30 to motor cylinder chambers 72 and 74, respectively.

Rotation of the inner valve member 40 in one direction relative to the outer valve member 42 will reduce the extent of communication of the motor conduit 28 with the reservoir 32 and increase the extent of communication of the motor conduit 28 with the pump 24. This results in high pressure fluid from the pump 24 being conducted to the motor cylinder chamber 72. This high fluid pressure moves the piston 76 toward the right (as viewed in FIG. 1). As the piston 76 moves toward the right, fluid discharged from the chamber 74 is conducted to the reservoir 32 through the motor conduit 30 and return conduit 34.

Similarly, rotation of the inner valve member 40 through the same distance in the opposite direction relative to the outer valve member 42 will reduce the extent of communication of the motor conduit 30 with the reservoir 32 and increase the extent of communication of the motor conduit 30 with the pump 24. This results in the same relatively high fluid pressure being conducted from the pump 24 to the motor cylinder chamber 74 as was previously conducted to the motor cylinder chamber 72 upon rotation of the steering wheel in the other direction. The relatively high fluid pressure in the motor cylinder chamber 74 moves the piston 76 toward the left (as viewed in FIG. 1). As the piston 76 moves toward the left, fluid discharged from the chamber 72 is conducted to the reservoir 32 through the motor conduit 28 and return conduit 34.

As the power steering motor 31 operates, the rack 66 rotates the pinion gear 64 and follow-up member 54. This rotates the outer valve member 42 relative to the inner valve member 40. As the power steering motor 31 is operated to turn the steerable vehicle wheels to an extent corresponding to the extent of rotation of the inner valve member 40, the rack 66 rotates the pinion 64 through a distance sufficient to move the outer valve member 42 to its central position relative to the inner valve member. When this occurs, the fluid pressure in the motor cylinder chambers 72 and 74 equalizes and the motor 31 stops operating.

Figure 2:
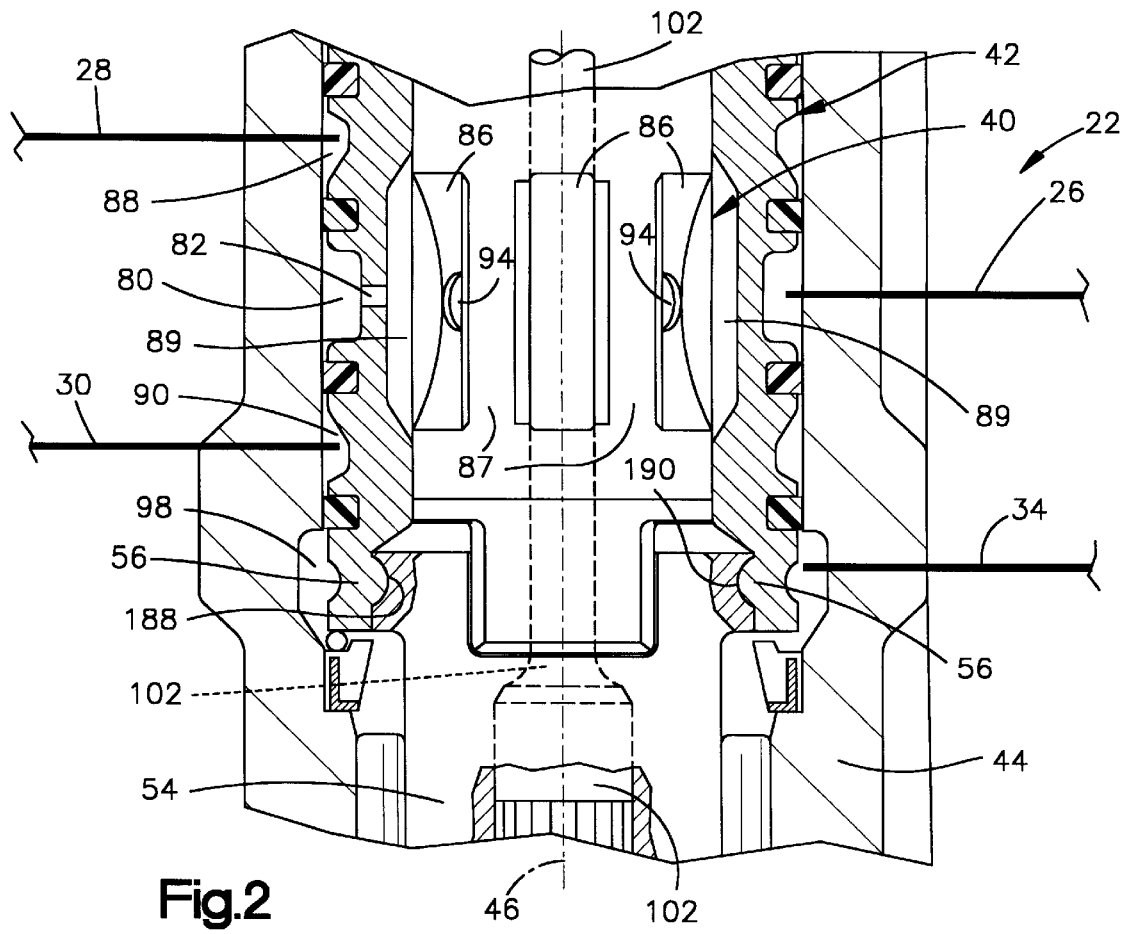
FIG. 2 is an enlarged fragmentary sectional view of a portion of FIG. 1 and illustrating the manner in which an outer valve member is connected with a follow-up member.

When the power steering control valve 22 is in the initial position, fluid pressure from the pump 24 is conducted to an annular central groove 80 (FIGS. 1 and 2) formed in the outer valve member 42. Fluid flows from the groove 80 to the inside of the cylindrical outer valve member 42 through three passages 82 (FIG. 2) spaced equal distances apart about the circumference of the groove 80. The inner valve member 40 has axially extending grooves 86 and lands 87 (FIG. 2) which cooperate with axially extending grooves 89 and lands formed inside the outer valve member 42 in a known manner. One set of grooves on the inside of the outer valve member 42 is connected in fluid communication with an annular outer groove 88 connected with the motor conduit 28. A second set of axially extending grooves on the inside of the outer valve member 42 is connected in fluid communication with an annular outer groove 90 formed in the outer valve member and connected with the motor conduit 30.

Openings 94 (FIG. 2) extend radially inwardly on alternate grooves 86 formed in the inner valve member 40 to an axially extending central passage in the inner valve member. The central passage is connected in fluid communication with a chamber 98 at the lower end of the outer valve member 42. The chamber 98 is connected in fluid communication with the reservoir 32 (FIG. 1) through the return conduit 34.

A torsion bar 102 is disposed in the axially extending fluid return passage formed on the central axis 46 of the inner valve member. The upper end of the torsion bar 102 is fixedly connected to the valve stem 50 and the lower end of the torsion bar is fixedly connected to the follow-up member 54. The torsion bar 102 twists to enable relative rotation to occur between the inner and outer valve members 40 and 42. When rotational force is no longer applied to the steering wheel and inner valve member 40, the torsion bar urges the inner and outer valve members 40 and 42 to their initial positions.

The power steering control valve 22 is hydraulically centered. Therefore, when the inner and outer valve members 40 and 42 are in their initial or unactuated positions, the fluid pressure conducted through the motor conduits 28 and 30 to the power steering motor 31 are equal. Upon rotation of the inner valve member 40 relative to the outer valve member 42 through a first distance in a clockwise direction from the initial or unactuated position, a first fluid pressure is conducted through one of the motor conduits 28 or 30 to the power steering motor 31. Similarly, upon rotation of the inner valve member 40 relative to the outer valve member 42 through the same distance in the counterclockwise direction, the same fluid pressure is conducted through the other motor conduit 28 or 30 to the power steering motor 31.

Even though the inner and outer valve members 40 and 42 are accurately made, even small tolerance variations in the location and/or configuration of the lands 87 and grooves 86 on the outside of the inner valve member and the lands and grooves 89 on the inside of the outer valve member 42 can effect exactly where the inner and outer valve members 40 and 42 are relative to each other in the pressure balanced, hydraulically centered condition. As a practical matter, the hydraulically centered condition of the inner and outer valve members 40 and 42 is ascertained by assembling the valve members and checking the fluid pressures obtained.

When the inner and outer valve members 40 and 42 are in the initial or unactuated position, a relatively small amount of relative movement between the valve members effects little or no change in the fluid pressure conducted to the power steering motor 31. However, as the extent of the relative movement between the inner and outer valve members increases, the extent of the change in pressure with an increment of relative movement increases.

Figure 4:
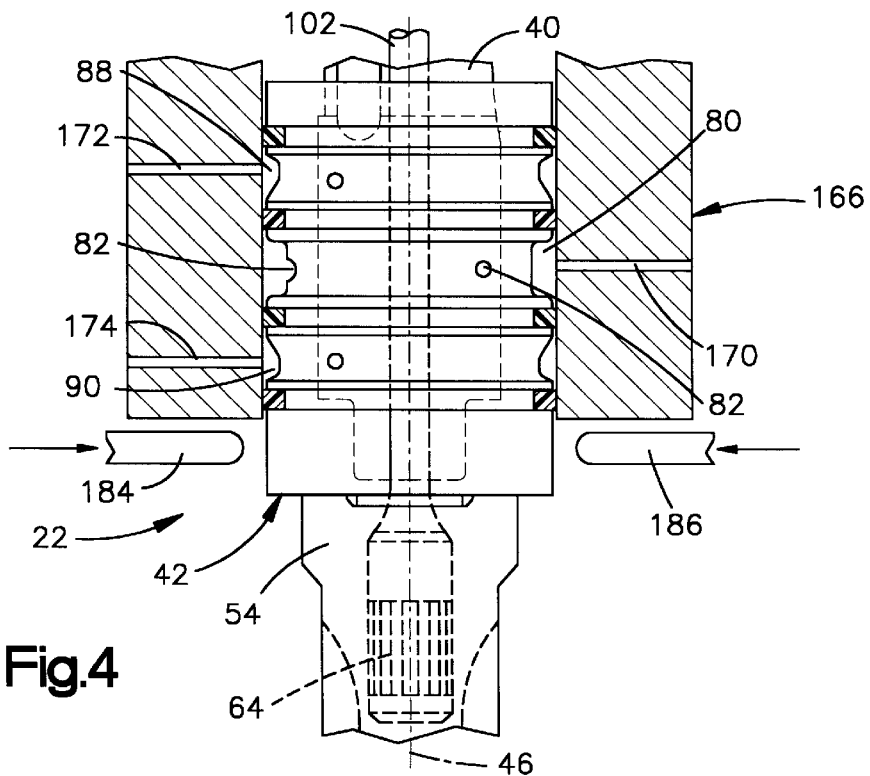
FIG. 4 (on sheet 2 of the drawings) is a schematic illustration depicting the manner in which the outer valve member is plastically deformed inward to grip the follow-up member when the inner and outer valve members are in a hydraulically centered condition.

To determine the hydraulically centered position of the inner and outer valve members 40 and 42, the lower end of the torsion spring 102 is fixedly connected with the follow-up member 54 and pinion 64. The inner valve member 40 is positioned on the follow-up member 54 (FIG. 4) with the torsion spring 102 extending through a central axial passage in the inner valve member. The upper end portion of the torsion spring 102 is fixedly connected with the inner valve member 40.

The outer valve member 42 is then telescoped over the inner valve member 40. The follow-up member 54, torsion spring 102, and inner valve member 40 form an assembled unit and are rotatable together relative to the outer valve member 42. The outer valve member 42 has not yet been connected to the follow-up member 54.

The inner and outer valve members 40 and 42 are then positioned in a fixture 166 (FIG. 3). Hydraulic fluid is conducted through a passage 170 in the fixture 166 to the central groove 80 in the outer valve member 42. The hydraulic fluid flows through passages in the inner and outer valve members 40 and 42 to passages 172 and 174 in the fixture 166. The passages 172 and 174 correspond to the motor conduits 28 and 30 of FIG. 1.

The outer valve member 42 is then rotated to locate a preliminary initial position in which substantially equal fluid pressures are present at the passages 172 and 174. The outer valve member 42 is then rotated from the preliminary initial position to a first actuated position. When the outer valve member 42 is in the first actuated position, a relatively high predetermined fluid pressure is present at the passage 172. Although many different fluid pressures could be selected, in one specific instance, a fluid pressure of 100 psi was selected. When the fluid pressure of 100 psi was obtained at the passage 172, the relative positions of the inner and outer valve members 40 and 42 were noted and will be referred to herein as the first actuated position.

The outer valve member 42 is then rotated in the opposite direction relative to the stationary inner valve member 40 until the same predetermined fluid pressure is obtained at the passage 174. Thus, in the example, the outer valve 42 is rotated in the opposite direction until a fluid pressure of 100 psi is obtained at the passage 174. The relative position of the inner and outer valve members 40 and 42 is then noted. This position is referred to herein as the second actuated position.

The outer valve member 42 is then rotated back to a central position half way between the first and second actuated positions. Thus, the arcuate distance which the outer valve member 42 rotates from the central position to the first actuated position is equal to the arcuate distance through which the outer valve member 42 rotates from the central position to the second actuated position. The control valve 22 is in a hydraulically centered condition when the outer valve member 42 is in the central position midway between the first and second actuated positions. Although it is preferred to rotate the outer valve member 42 relative to the inner valve member 40 to locate the central position, the inner valve member could be rotated relative to the outer valve member if desired.

When the outer valve member 42 is in the central position relative to the inner valve member 40, the outer valve member 42 is fixedly connected to the follow-up member 54. The outer valve member 42 is fixedly connected with the follow-up member 54 by plastically deforming the outer valve member 42 inward toward the longitudinal central axis 46 of the power steering control valve 22. The material of the outer valve member 42 then grips the follow-up member 54 to hold the outer valve member against movement relative to the follow-up member.

To plastically deform the outer valve member 42, a pair of punches or tools 184 and 186 (FIG. 4) are moved diametrically inward toward opposite sides of the outer valve member 42. The tools 184 and 186 are effective to form a pair of indentations 56 (FIG. 2) by plastically deforming the material of the outer valve member 42 into a pair of hemispherical recesses 188 and 190 formed at diametrically opposite portions of the follow-up member 54.

The two tools 184 and 186 (FIG. 4) apply pressure against diametrically opposite areas on the cylindrical outer valve member 42 to plastically deform the material of the outer valve member into the recesses 188 and 190 in the upper (as viewed in FIG. 2) end of the follow-up member 54. This results in the outer valve member 42 being fixedly connected with the follow-up member 54. At this time, the inner valve member 40 is in a hydraulically centered position relative to the outer valve member 42. The outer valve member 42 is fixedly connected with the follow-up member 54. The outer valve member 42 is connected with the inner valve member 40 through the follow-up member 54 and the torsion bar 102.

Upon initiation of a power steering operation, the valve stem 50 of the power steering control valve 22 is rotated under the influence of force transmitted from the vehicle steering wheel. This force resiliently deflects the torsion bar 102 and moves the inner valve member 40 relative to the outer valve member 42. Hydraulic fluid is then directed to one of the motor conduits 28 or 30 to effect operation of the power steering motor 31 in the manner previously explained. As the power steering motor 31 is operated, the rack 66 rotates the pinion gear 64 on the follow-up member 54. Rotation of the follow-up member 54 rotates the outer valve member 42 back toward the initial or unactuated position relative to the inner valve member 40. When the inner and outer valve members 40 and 42 reach their initial or unactuated positions, operation of the power steering motor 31 is interrupted.

From the above description of the invention, those skilled in the art will perceive improvements, changes and modifications. Such improvements, changes and modifications within the skill of the art are intended to be covered by the appended claims.

Having described the invention, the following is claimed:

1. A method of assembling a power steering control valve having an inner valve member which is connected with a follow-up member by a torsion bar and an outer valve member which at least partially encloses the inner valve member, said method comprising the steps of:

moving inner and outer valve members relative to each other to determine when said inner and outer valve members are in a hydraulically centered condition relative to each other; and fixedly interconnecting said outer valve member and said follow-up member when said inner and outer valve members are in the hydraulically centered condition by plastically deforming said outer valve member inward toward a longitudinal central axis of said follow-up member to grip said follow-up member with said outer valve member.

2. A method as set forth in claim 1 wherein said step of plastically deforming said outer valve member includes moving a portion of said outer valve member into a recess in said follow-up member.

3. A method as set forth in claim 1 wherein said step of plastically deforming said outer valve member inward toward a longitudinal central axis of said follow-up member includes applying force against an outer side surface of said outer valve member and plastically deforming material of said outer valve member under the influence of the force applied against the outer side surface of said outer valve member.

4. A method as set forth in claim 1 wherein said step of moving inner and outer valve members relative to each other to determine when said inner and outer valve members are in a hydraulically centered condition relative to each other includes rotating one of said valve members in a first direction relative to the other valve member to a first actuated position to obtain a first fluid pressure at a first port, rotating said one of said valve members in a second direction relative to the other valve member to a second actuated position to obtain the first fluid pressure at a second port, and rotating said one of said valve members relative to the other valve member to a position half way between said first and second actuated positions.

5. A method as set forth in claim 1 wherein said step of fixedly interconnecting said outer valve member and said follow-up member includes retaining said outer valve member in an axial position relative to said follow-up member.

\* \* \* \* \*